Figure 1:
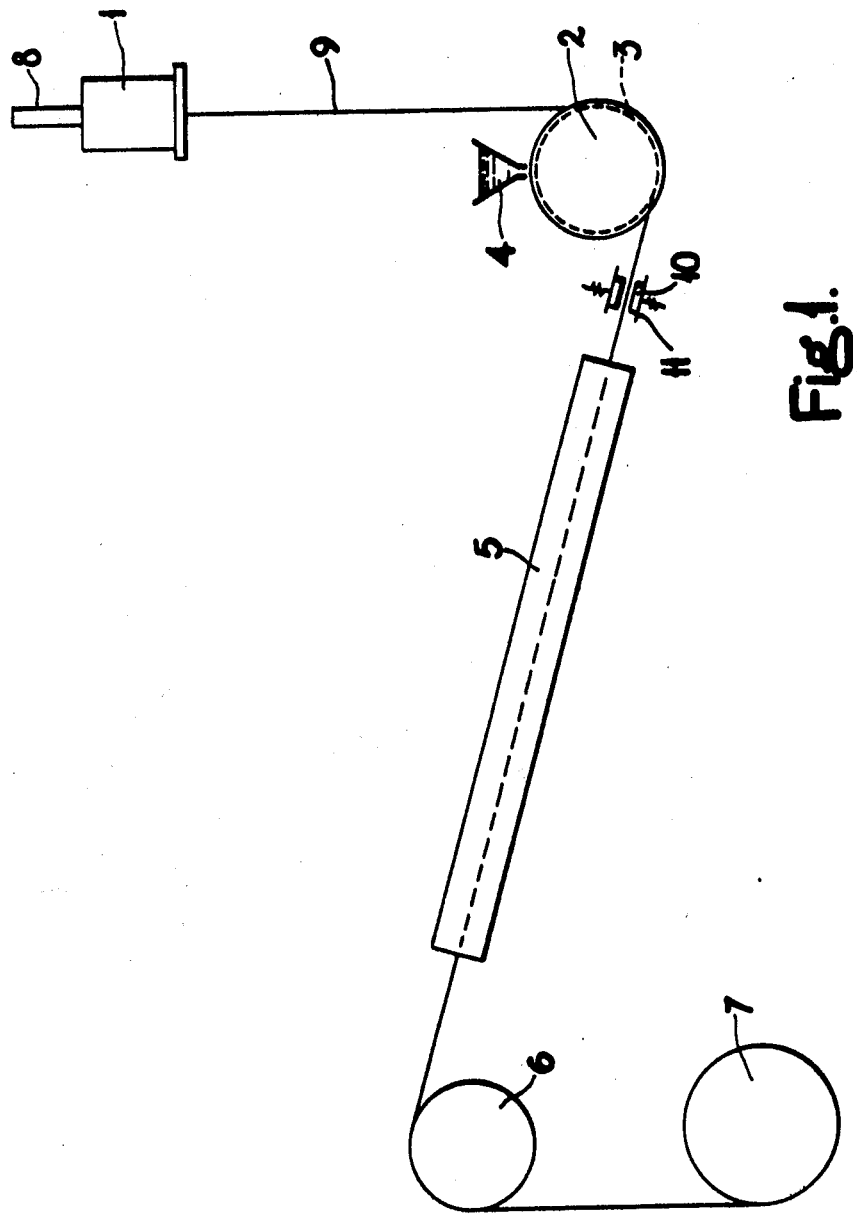

United States Patent [19]

Haines

[11] 4,113,350
[45] Sep. 12, 1978

[54] OPTICAL FIBRE WAVEGUIDES

[75] Inventor: Ernest Martin Haines, Pinner, England

[73] Assignee: Telephone Cables Limited, Dagenham, England

[21] Appl. No.: 664,706

[22] Filed: Mar. 8, 1976

[30] Foreign Application Priority Data

Mar. 18, 1975 [GB] United Kingdom ............... 11192/75

[51] Int. Cl.² ................................................. G02B 5/14
[52] U.S. Cl. ................................................. 350/96.29
[58] Field of Search ......... 350/96 WG, 96 R, 96 GN, 350/96 M, 96 B

[56] References Cited

U.S. PATENT DOCUMENTS

| | | | |
|---|---|---|---|
| 3,402,064 | 9/1968 | Marzocchi | 350/96 M X |
| 3,506,476 | 4/1970 | Marzocchi | 350/96 M X |
| 3,508,950 | 4/1970 | Marzocchi | 350/96 M X |
| 3,806,224 | 4/1974 | MacChesney et al. | 350/96 WG |
| 3,853,384 | 12/1974 | Pinnow et al. | 350/96 WG |
| 4,000,936 | 1/1977 | Gloge | 350/96 WG |

OTHER PUBLICATIONS

*Laser Focus*, Dec. 1975, p. 63.

Gloge, Article in *Bell System Technical Journal* Feb. 1975, pp. 245-262.

*Primary Examiner*—John K. Corbin
*Assistant Examiner*—Rolf Hille
*Attorney, Agent, or Firm*—Kirschstein, Kirschstein, Ottinger & Cobrin

[57] ABSTRACT

An optical fibre waveguide comprising a glass or vitreous silica fibre is coated with a synthetic resin material, preferably a thermosetting resin such as a polyurethane resin, containing in at least part of its thickness a dispersion of a powdered non-metallic inorganic filler such as lampblack, silica flour or titania powder. The filler material has a modulus of elasticity at least as high as that of the glass or silica fibre, and its presence in the coating composition increases the elastic modulus of the latter, thus improving the load carrying capacity of the coated fibre, to an extent depending on the thickness of the coating. The coating preferably consists of a plurality of thin layers, which may be of varying composition in respect of the filler materials incorporated and the proportions of filler used. A repetitive recycling process for forming a plurality of coating layers on the fibre is described.

8 Claims, 3 Drawing Figures

OPTICAL FIBRE WAVEGUIDES

This invention relates to optical fibre waveguides comprising glass fibres of the kind having a composition and structure such that the refractive index of the fibre material varies over the cross-section of the fibre, so as to cause electromagnetic radiation, in the visible and infra-red regions of the spectrum, incident on one end of the fibre to be propagated along the fibre, thus enabling optical signals to be transmitted along the fibre, the fibres being designed to give either multimode or single mode propagation of radiation as desired. The invention also relates to methods of manufacturing optical fibre waveguides of the form described, and to communication systems incorporating such optical fibre waveguides for the transmission of signals.

It is to be understood that the term "glass," as used herein with reference to the optical fibre waveguides, includes vitreous silica, either in the substantially pure state or containing a dopant for modifying its refractive index, and that the fibres referred to may be of solid or tubular form.

It has been proposed to provide glass fibres, for use as optical waveguides, with a coating of synthetic resin material such as a polyurethane resin, to protect the fibres from surface damage which might result from contact with equipment employed, for example, for drawing or guiding the fibres or winding them upon a drum, or from mutual contact between the fibres, for example when they are being assembled in a bundle for incorporation in a telecommunications cable. Such surface damage is undesirable since it can cause a considerable reduction in the intrinsic tensile strength of the fibres.

Optical fibre waveguides, under normal conditions of use in cables, are liable to be subjected to considerable bending strains and tensile forces when the cables are pulled through ducts and otherwise manipulated: it is therefore desirable that the mechanical strength of the fibres should be as high as possible, to avoid breakage. Whilst a resin coating of the kind referred to above serves to protect a glass fibre from surface damage and resulting reduction in intrinsic tensile strength, in view of the low elastic modulus of the synthetic resin coating material employed the mechanical strength of the coated fibre is not much greater than that of an uncoated, undamaged fibre, unless the coating is of excessive thickness. The coating thickness which can be tolerated is limited by the tendency for undesirable thermal strains to develop, in the fibre and/or in the coating, due to the difference between the thermal expansion coefficients of the fibre and coating material, this tendency increasing with increasing coating thickness.

It is an object of the present invention to provide an improved optical fibre waveguide including a protective coating which is capable of imparting considerably increased mechanical strength to the said waveguide without the necessity of employing a coating of undesirably large thickness.

According to the invention, in an optical fibre waveguide consisting of a glass fibre of the kind referred to and as hereinbefore defined, having a continuous surface coating of synthetic resin material, at least part of the thickness of the said coating contains a dispersion of finely powdered, non-metallic, inorganic filler material the modulus of elasticity of which is substantially equal to or greater than that of the glass fibre.

The expression "modulus of elasticity" as used herein is to be understood to have its usual meaning, namely the ratio of applied stress to the resulting strain in a body within its elastic range.

The presence in the fibre coating of a filler material having a relatively high modulus of elasticity increases the modulus of elasticity of the coating as a whole, and hence increases the mechanical strength of the coated fibre. In particular the values of the breaking strain (that is to say the minimum bending strain under which the fibre breaks) and the breaking load (that is to say the minimum tensile force under which the fibre breaks) of the coated fibre are increased.

The filler material employed in the coating preferably has a coefficient of thermal expansion compatible with, that is to say of the same order as or not greatly exceeding, that of the glass or vitreous silica of which the optical fibre is formed. Suitable filler materials include, for example, carbon in a powdered form such as lampblack, silica flour, and titania powder. Carbon is especially advantageous for use as the filler in a coating for silica fibres, since its modulus of elasticity is higher than that of silica or titania, whereas from the point of view of thermal expansion silica flour would be the ideal filler in a silica fibre coating, although its modulus of elasticity is not as high as that of carbon. The choice of a filler material will thus be determined to some extent by the respective requirements as to thermal expansion characteristics and elastic modulus of the coating, depending on whether in use the optical fibre waveguide is more likely to be subjected to wide variations of temperature or to conditions in which a high load carrying capacity would be beneficial. In addition, white filler materials such as silica powder or titania might be preferred in some cases, since they can be employed in conjunction with dyes and thus used for color coding of waveguides. The resin base of the coating is preferably a thermosetting resin, for example a polyurethane resin.

An additional advantage of the presence of a filler in the resin coating is that it renders the coating opaque, and will thus prevent the occurrence of optical crosstalk between adjacent fibres in operation of a cable incorporating a bundle of the individually coated fibres.

The thickness of the coating is preferably such that the cross-sectional area of the coating is approximately half that of the glass fibre, or greater: for example, in the case of a fibre of 100 micrometers diameter, the coating is preferably at least 10 micrometers thick. The coating may consist of a single layer of resin containing a substantially uniform dispersion of filler material throughout its thickness, the composition of the coating suitably being from 10 to 45% of filler material and from 90 to 55% of the fully cured resin, by weight. The upper limit of the proportion of filler in the coating is determined partly by the desired balance between thermal expansion characteristics and elastic modulus, and is also limited by the necessity for the coating composition, prior to curing, to possess suitable flow characteristics for producing, in practice, a coating of uniform thickness over the whole of the glass fibre. The preferred proportion of filler is from 10 to 15% of the weight of the cured coating.

The incorporation of carbon powder, in the preferred proportion of 10 to 15% by weight, in a polyurethane resin coating increases the elastic modulus of the coating, in the axial direction of the fibre, from $2 \times 10^9$ N/m² (newtons per square meter) to approximately 2.5 × 10¹⁰ N/m², irrespective of the thickness of the coating. A similar proportion of titania powder or silica flour increases the elastic modulus of the coating, in the axial direction, to approximately $1.0 \times 10^{10}$ N/m². In each case the elastic modulus of the coating in the radial direction is somewhat less than that in the axial direction. Resulting from the protection afforded by the coating, the breaking strain of the coated fibre is increased to approximately 3%, as compared with the usual value of about 0.5% for an uncoated fibre, due to surface damage: the value of the breaking strain is not appreciably dependent on the thickness of the coating. The increased elastic modulus results in an improvement in the breaking load of the coated fibre which increases in proportion to the thickness of the filled coating, as will be shown in the specific Examples to be described hereinafter.

Although, as indicated above, satisfactory improvements in the strength of the coated glass fibre can be obtained with a filled coating consisting of a single layer of substantially uniform composition, the coating is preferably formed of a plurality of thinner layers, each suitably from 3 to 5 micrometers thick, applied to the fibre successively.

The formation of the coating in a succession of thin layers is advantageous in that it reduces or prevents distortion of the glass fibre due to a difference between the thermal expansion coefficients of the fibre and the coating as a whole: such distortion, in the form of microscopic bends or kinks, is liable to occur when a relatively thick resin coating is applied to a glass fibre by extrusion, and is undesirable since it gives rise to optical losses, known as "microbending losses," in operation of the waveguide.

Another advantage of a multilayer coating is that the composition of the respective layers can be varied, thus permitting greater control of the properties of the coated fibre. Thus the different layers may contain different proportions of filler, in each case within the range of proportions referred to above in connection with a single layer coating, and/or different filler materials within such proportions, and one or more layers of resin free from filler may be included if desired. Preferably the layers are so arranged that the elastic modulus of the coating is highest in the innermost layer or layers and decreases with successive layers outwards, and advantageously one or more of the outermost layers are free from filler: this arrangement increases the axial rigidity and reduces the radial rigidity of the composite coating, thus facilitating close packing of the coated fibres in bundles while maintaining the improved strength of the individual fibres. If desired, different resins may be employed for forming the different layers, provided that the resins used have mutual wettability and are compatible with one another chemically and physically, for example having substantially matching thermal expansion characteristics.

With a multilayer coating, the increased breaking strain of the coated fibre is essentially achieved by the first layer, subsequent layers giving little or no further improvement in this respect. The breaking load, however, is increased with each layer, so that from the point of view of attaining the maximum breaking load it is desirable to form the coating of the largest possible number of layers, within the limits imposed by undesirable rigidity of the coated fibre and the risk of thermal strains developing in use.

For the manufacture of an optical fibre waveguide in accordance with the invention, the desired filled coating material, or each such material where the coating is to be formed of a plurality of layers of different compositions, is prepared by mixing the powdered filler material and the resin in a suitable organic solvent, in the required relative proportions. The powder is readily dispersed in the resin solution, and remains in suspension for a convenient storage period and during the application of the coating to the glass fibre.

In the preferred method of manufacturing an optical fibre waveguide in accordance with the invention, including the application of the coating, or at least the first layer when a multilayer coating is to be applied, a glass fibre preform consisting of a vitreous rod or tube of the required composition, is fed into a heating zone and the fibre is drawn downwardly from the preform, is cooled and solidified as it leaves the heating zone, and is then passed immediately through means for applying the coating suspension, and then through an oven or other suitable heating means maintained at a suitable temperature for effecting evaporation of the solvent and curing of the resin of the coating, the arrangement being such that the drawn glass fibre does not come into contact with any drawing, guiding or other equipment before it is coated. This method is substantially that described in the specification of copending British patent application No. 41336/73, said method being modified for the purposes of the present invention by incorporating the desired filler material in the coating resin. The incorporation of a powdered filler material in the coating solution has the additional advantage that it increases the viscosity of the coating material so as to facilitate the formation of a smooth coating, the formation of drops on the coating surface before the fibre enters the oven being prevented.

Two forms of apparatus are described in the aforesaid specification, in which the means for applying the coating respectively consist of a bath suitably comprising a body of felt or like material impregnated with the coating material, and guide means comprising a guiding surface supplied with coating material so that as the fibre passes over said surface it is immersed in the coating material. Either of these forms of apparatus may be employed in the manufacture of the waveguides of the present invention.

If desired, either of the forms of apparatus referred to above can be further modified by the provision of one or more additional coating means, together with an additional heating means associated with each such coating means, so that a plurality of coating layers can be applied to the glass fibre by passing the fibre through the respective coating and heating means in succession. However, for convenience, for the manufacture of an optical fibre waveguide having a multilayer coating in accordance with the invention, it is preferred to apply only the first layer in the first apparatus of the kind referred to above, wherein the coating is applied immediately after drawing of the fibre, and to employ a second apparatus for the application of the subsequent layers, if desired provision being made for feeding the glass fibre carrying the first coating layer directly to the second apparatus. The said second apparatus preferably comprises means for applying coating material to the fibre, which means may be of a similar form to that employed in the first apparatus, a heating means for curing the coating, and means for recycling the fibre through said coating means and heating means repetitively until the required number of coating layers has been applied thereto.

Figure 2:
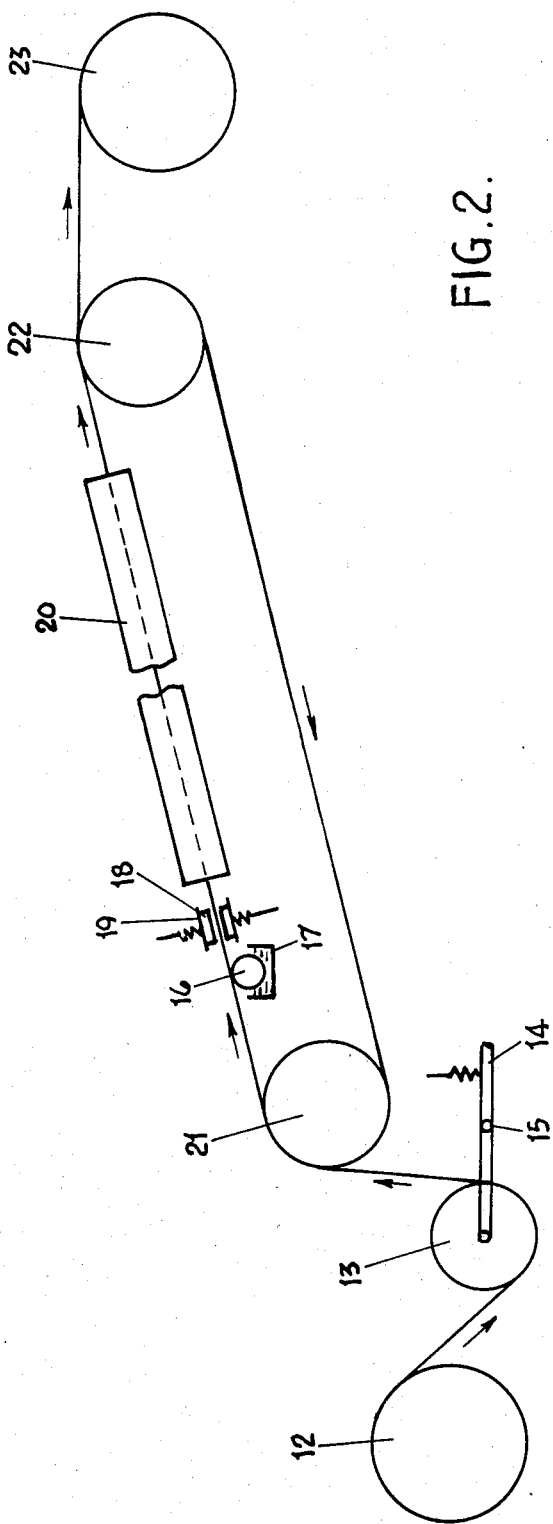
Figure 3:
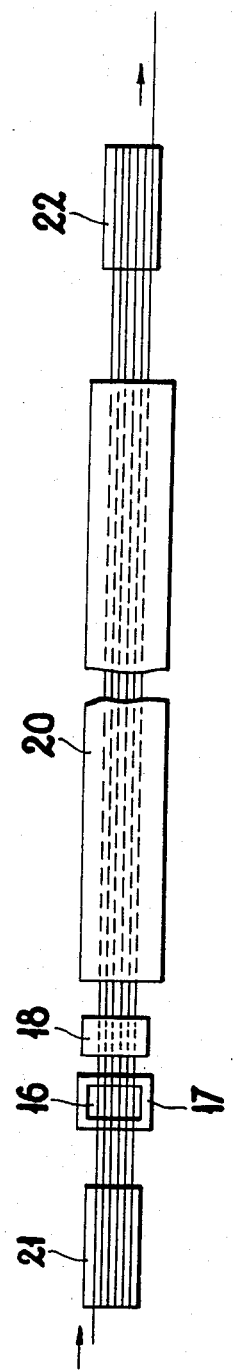

Some specific forms of optical fibre waveguides in accordance with the invention, and the method and apparatus which we have employed for their manufacture, will now be described in the following examples, with reference to the accompanying diagrammatic drawings, in which FIG. 1 shows in elevation the apparatus employed for drawing the glass fibre and applying thereto a single layer of coating material, FIG. 2 shows in elevation the apparatus employed for the application of a plurality of further coating layers to a fibre which has already been coated with one layer by means of the apparatus of FIG. 1, and FIG. 3 is a plan view of part of the apparatus of FIG. 2.

The apparatus shown in FIG. 1, which is similar to that shown in FIG. 4 of the above-mentioned application No. 41336/73, comprises a furnace 1 consisting essentially of a graphite heating element, a guide pulley 2 mounted so as to be freely rotatable and having a channelled rim, indicated by the broken line 3, a reservoir 4 for the coating suspension arranged to feed the suspension into the channel 3, an elongated tubular oven 5 inclined upwards at an angle of approximately 15° and arranged to be maintained at a suitable temperature for curing the resin of the coating material, a freely rotatable guide pulley 6, and a rotatable drum 7 on to which the coated fibre is wound. In operation of this apparatus, an optical fibre preform 8, consisting of a vitreous rod or tube of the required composition, is fed vertically at a slow rate into the top of the furnace 1 by means of a suitable feed mechanism, the furnace being maintained at a high temperature such that the preform is softened sufficiently to enable it to be drawn to fibre. The drawing is effected by rotation of the drum 7, the process being started by first drawing a suitable length of fibre in an uncontrolled manner, or by welding a length of previously drawn fibre on to the leading end of the preform, and in either case attaching the free end of the fibre to the drum. The drawn fibre 9, which solidifies rapidly on emerging from the furnace, passes first around the pulley 2, being immersed in the coating material filling the channel 3 without actually coming into contact with the pulley itself, and the fibre thus covered with a layer of the coating material then passes through the oven 5, where the coating is caused to set as a result of evaporation of the solvent and curing of the resin, and the coated fibre is finally guided over the pulley 6 to be wound on the drum 7. The upward inclination of the path of the fibre after passing round the pulley 2 and as it passes through the oven 5 promotes the production of a coating of substantially uniform thickness. A pair of felt wiper pads 10 may be provided between the pulley 2 and the oven 5, for removing surplus coating material from the fibre: the pads are mounted between spring-loaded bars 11 to which variable pressure can be applied, for controlling the thickness of the coating. Means are provided for driving the drum 7, and for controlling the speed of rotation of the drum in relation to the rate at which the preform 8 is fed into the furnace 1: these means, and the aforesaid feed mechanism, are not shown in the drawing, but are of known form and may suitably be of the form described in the above-mentioned application No. 41336/73.

EXAMPLE 1

The optical fibre waveguide of this example comprises a composite silica fibre of diameter 100 micrometers, composed of a core of doped silica and a cladding layer of substantially pure silica, provided with a single layer coating 10 micrometers thick consisting of, by weight, 10 to 15% lampblack and 90 to 85% polyurethane resin. This waveguide is manufactured by means of the apparatus shown in FIG. 1: a composite silica rod 8 of diameter 15 to 20 mm is fed into the furnace 1, which is maintained at a temperature of 2000° C., the silica fibre is drawn as described above, and is passed round the pulley 2, in the channel 3, which is supplied from the reservoir 4 with a coating suspension consisting of 2.5 to 4.0% by volume of lampblack and 97.5 to 96% by volume of a commercially available solution of polyurethane resin in an organic solvent, the solution containing 30% by weight of the resin. The coated fibre is then passed through the oven 5, which is 1.5 meters long and is maintained at a temperature of 300° C. The rate of travel of the fibre through the system is 1.5 meters per second.

The modulus of elasticity of a coating so formed, containing 10% by weight of lampblack, is $2.5 \times 10^{10}$ N/m$^2$, which is approximately one-third of the elastic modulus of silica. A specific sample of the coated fibre had a breaking strain of 3.7% and a breaking load exceeding 30 newtons, compared with a breaking strain of 0.6% and a breaking load of 4 newtons in the case of a similar, uncoated, silica fibre.

EXAMPLE 2

An optical fibre waveguide comprising a silica fibre similar to that referred to in Example 1 has a coating consisting of a first layer of polyurethane resin containing 10 to 15% by weight of lampblack, a second layer of polyurethane resin containing the same proportion of titania powder, and a third, outermost, layer of polyurethane resin free from filler. With the three coating layers of approximately equal thickness and a total coating thickness such that the cross-sectional area of the coating is approximately equal to that of the silica fibre, the breaking load of the coated fibre is 15% greater than that of an uncoated fibre having the same breaking strain (that is to say, free from surface damage). By comparison, with a coating of the same thickness but composed entirely of the resin free from filler, the breaking load is only 2% higher than that of an uncoated fibre having the same breaking strain. (It will be understood that an uncoated fibre with reduced breaking strain due to surface damage would also have a very much reduced breaking load).

EXAMPLE 3

The optical fibre waveguide of this example is similar to that described in Example 2, but has a coating of total cross-sectional area double that of the silica fibre and consisting of two inner layers of polyurethane resin each containing 10 to 15% by weight of lampblack, two layers of the same resin each containing 10 to 15% by weight of titania, and two outer layers of the unloaded resin. In this case, the breaking load of the coated fibre is increased by 30% over that of an uncoated silica fibre of the same breaking strain, as compared with an increase of 4% with a coating consisting only of the unloaded resin.

In the manufacture of the waveguides of Examples 2 and 3, the fibre drawing and application of the first carbon-loaded coating layer are carried out as described in Example 1. The subsequent coating layers may be applied by an extension of the apparatus of FIG. 1, comprising additional coating pulleys and curing ovens, or by means of the apparatus shown in FIGS. 2 and 3, to be described below. The volume proportions of titania powder and resin solution in the titania-containing coating mixture are the same as those in the carbon-containing coating mixture, as specified in Example 1.

EXAMPLE 4

A silica fibre, similar to that described in Example 1, is coated successively with seven layers of carbon-loaded polyurethane resin, six layers of titania-loaded polyurethane resin, and six layers of clear polyurethane resin free from filler material; all the layers loaded with carbon or titania contain the same proportion of the filler powder, namely 10 to 15% by weight after curing. The total thickness of each of the three types of coating, namely of the seven carbon-loaded layers, the six titania-loaded layers, and the six clear resin layers, is 28 micrometers: thus the overall diameter of the coated fibre is 268 micrometers, the cross-sectional area of the coating being approximately six times that of the 100 micrometers diameter silica fibre.

The first carbon-loaded layer is applied to the silica fibre immediately after drawing of the latter, by means of the apparatus of FIG. 1, as described in Example 1, and the remaining 18 coating layers are applied by means of the apparatus of FIGS. 2 and 3. The volume compositions of the coating mixtures are as specified in the previous Examples.

The apparatus shown in FIG. 2, and in part in FIG. 3, comprises a fibre feed drum 12, a pulley 13 which is mounted on one end of a spring-loaded bar 14 pivoted at 15, and beneath which the fibre from the drum 12 passes, a roller 16 having a plurality of channels on its cylindrical surface and partly immersed in a bath 17 of coating suspension with which the channels are filled as the roller rotates, a pair of felt pads 18 on spring-loaded mountings 19, an elongated tubular oven 20 similar to that of FIG. 1, freely rotatable guide pulleys 21 and 22 for guiding the fibre from the pulley 13 over the coating roller 16, between the pads 18 for adjustment of the coating thickness, and through the curing oven 20, either for a single pass or repetitively as desired, and a take-up drum 23. The cylindrical surfaces of the pulleys 21 and 22 are formed with grooves for guiding a plurality of individual strands of the coated fibre, side by side, over the roller 16, between the felt pads and through the oven. The directions of travel of the fibre are indicated by arrows.

The rate of travel of the fibre through the system is controlled by the speed of rotation of the take-up drum 23. Any variations in the tension of the fibre are compensated by variations in the speed of rotation of the drum 12, which is adjusted by vertical movements of the pivoted pulley 13 in response to such tension variations. When the fibre is to be recycled over the roller 16 and through the oven 20 repetitively, for the application of a plurality of coating layers, the rate of travel of the fibre and the oven temperature must be so adjusted that all the coating layers on the fibre are fully cured, but that none of the layers are over-cured.

For the manufacture of the optical fibre waveguide of Example 4, the bath 17 initially consists of the carbon-loaded resin solution, and the drum 12 carries a length of fibre with the first coating layer previously applied as described in Example 1. The free end of the fibre on this drum is passed manually beneath the pulley 13, and then five times over the pulley 21 and roller 16, through the oven 20, over the pulley 22 and back to the pulley 21 beneath the oven, and finally a sixth time over the roller 16, through the oven and over the pulley 22 and thence to the drum 23, to which the fibre end is attached, the fibre being laid successively in the series of grooves in the pulleys and roller, so that on completion of the operation there are six strands of the fibre lying side by side throughout the system from pulley 21 to pulley 22. The wiper pads 18 are then placed in position. This arrangement is illustrated in FIG. 3, in which the pulleys, roller, and wiper pads are shown in exaggerated width in relation to their other dimensions, in order to show the individual strands of fibre. The application of six successive layers of the coating mixture to the silica fibre is then effected by rotation of the drum 23 until all the fibre on drum 12 has been transferred thereto after being drawn through the coating and curing system six times, at an appropriate speed for ensuring full curing of the respective coating layers. It will be apparent that the initial length of fibre drawn on to the drum 23 is incompletely coated: this length is subsequently discarded.

The procedure described above is repeated with the same length of fibre, first after replacing the coating bath 17 by a similar bath of the titania-loaded resin solution, and again with a bath of the clear resin solution, in each case the speed of travel of the fibre through the system being adjusted to ensure uniform curing of the coating layers at a constant oven temperature.

If desired, the above-described procedure can be modified by arranging for the fibre to be passed directly from the apparatus of FIG. 1 to that of FIG. 2, the fibre feed drum 12 of FIG. 2 being constituted by the take-up drum 7 of FIG. 1.

The optical fibre of Example 4, with a 19-layer coating formed as described above, has a breaking load 90% to 100% greater than that of an uncoated silica fibre of the same breaking strain, whereas with a coating of the same thickness but composed of the resin alone, without fillers, the breaking load, for the same breaking strain, would be only about 15% greater than that of the bare silica fibre. In order to achieve a 90% increase in breaking load with unloaded resin, a coating thickness of 235 micrometers would be required, giving a coated fibre diameter of 570 micrometers.

The above examples show that the invention is advantageous in enabling a given increase in breaking load, for a given breaking strain, to be obtained with a considerably thinner coating on the fibre than has hitherto been possible using an unloaded resin only for the coating. Hence high strength can be imparted to coated optical fibres of relatively small overall diameter and consequent high packing density for the formation of fibre bundles for incorporation in telecommunications cables.

I claim:

1. An optical fibre waveguide consisting of a glass fibre having a composition and structure such that the refractive index of the fibre material varies over the cross-section of the fibre, and provided with a continuous surface coating of synthetic resin material, wherein the said coating is formed of a plurality of layers each from 3 to 5 micrometers in thickness, applied to the glass fibre sucessively as resin solutions and each cured before the application of a succeeding layer, and wherein at least the innermost layer of said coating consists of a thermosetting resin containing a dispersion of finely powdered, non-metallic, inorgainc filler material the modulus of elasticity of which is at least substantially equal to that of the said glass fibre, which powdered filler material is incorporated in said resin solution as a suspension, each filler containing layer of the said coating consisting of 10 to 45% of said filler material and 90 to 55% of the fully cured thermosetting resin, by weight.

2. An optical fibre waveguide according to claim 1, wherein the total thickness of the said coating is such that the cross-sectional area of the coating is at least approximately half of the cross-sectional area of the said glass fibre.

3. An optical fibre waveguide according to claim 1, wherein the synthetic resin material of the said coating is of the same composition in all of the constituent layers of the coating.

4. An optical fibre waveguide according to claim 1, wherein the said filler material consists of at least one of the substances of the group consisting of carbon, silicon dioxide and titanium dioxide.

5. An optical fibre waveguide according to claim 1, wherein each filler-containing layer of the said coating consists of 10 to 15% of said filler material and 90 to 85% of fully cured thermosetting resin, by weight.

6. An optical fibre waveguide according to claim 1, wherein the said layers of the coating are of varying composition in respect of filler content and are so arranged that the modulus of elasticity of the coating is highest in the innermost layer.

7. An optical fibre waveguide according to claim 6, wherein at least one outermost layer of the said coating consists of thermosetting resin free from filler material.

8. An optical fibre waveguide according to claim 7, wherein the said coating consists of at least one inner layer of polyurethane resin containing 10 to 15% by weight of carbon powder, at least one intermediate layer of polyurethane resin containing 10 to 15% by weight of titanium dioxide powder, and at least one outer layer of polyurethane resin free from filler material, and wherein the total thickness of the coating is such that the cross-sectional area of the coating is at least equal to the cross-sectional area of the said glass fibre.

* * * * *